(12) United States Patent
Wu

(10) Patent No.: US 8,738,928 B2
(45) Date of Patent: May 27, 2014

(54) APPARATUS AND METHOD FOR PROCESSING EXTENSION INFORMATION IN IMAGE FILES

(75) Inventor: Peng Wu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 159 days.

(21) Appl. No.: 13/257,938

(22) PCT Filed: Oct. 25, 2010

(86) PCT No.: PCT/CN2010/078086
§ 371 (c)(1), (2), (4) Date: May 10, 2012

(87) PCT Pub. No.: WO2011/076037
PCT Pub. Date: Jun. 30, 2011

(65) Prior Publication Data
US 2012/0218275 A1    Aug. 30, 2012

(30) Foreign Application Priority Data

Dec. 23, 2009   (CN) .......................... 2009 1 0189321

(51) Int. Cl.
*G06F 11/30* (2006.01)
(52) U.S. Cl.
USPC ........................................................ 713/189
(58) Field of Classification Search
None
See application file for complete search history.

(56) References Cited

U.S. PATENT DOCUMENTS

| 6,493,028 | B1 * | 12/2002 | Anderson et al. .......... 348/222.1 |
| 7,546,334 | B2 * | 6/2009 | Redlich et al. ................ 709/201 |
| 8,516,366 | B2 * | 8/2013 | Hicks et al. .................... 715/255 |
| 2005/0108540 | A1 * | 5/2005 | Kusnoto et al. ............... 713/176 |
| 2008/0069540 | A1 * | 3/2008 | Takagi et al. ................. 386/117 |
| 2008/0148056 | A1 * | 6/2008 | Ginter et al. .................. 713/176 |
| 2008/0218805 | A1 * | 9/2008 | Dokuni ......................... 358/3.28 |
| 2008/0270792 | A1 | 10/2008 | Liu |
| 2009/0103789 | A1 * | 4/2009 | Danner et al. ................ 382/128 |
| 2009/0187604 | A1 * | 7/2009 | Guo et al. ..................... 707/200 |
| 2011/0019816 | A1 * | 1/2011 | Inami et al. .................... 380/28 |

FOREIGN PATENT DOCUMENTS

| CN | 1652113 | A | 8/2005 |
| CN | 101202641 | A | 6/2008 |
| CN | 101763397 | A | 6/2010 |
| EP | 1760612 | A1 | 7/2007 |
| JP | 2006260242 | A | 9/2006 |
| WO | 0208945 | A1 | 1/2002 |

OTHER PUBLICATIONS

International Search Report for PCT/CN2010/078086 dated Jan. 19, 2011.
"Exifer for Windows", http://web.archive.org/web/20040829035504/http://www.friedemann-schmidt.com/software/exifer/; XP-002717556; See pp. 1-5.

*Primary Examiner* — Farid Homayounmehr

\* cited by examiner

*Assistant Examiner* — Olanrewaju Bucknor
(74) *Attorney, Agent, or Firm* — Ling Wu; Stephen Yang; Ling and Yang Intellectual Property

(57) ABSTRACT

The present invention discloses an apparatus and a method for processing extension information in an image file, wherein, the method includes: editing the extension information for image file; encrypting the edited extension information, and additionally writing the encrypted extension information into the image file; and extracting the encrypted extension information from the needed image file, and decrypting the encrypted extension information. The apparatus comprises an editing module, an encrypting module and a decrypting module. The present invention realizes the method for editing the extension information for image files in various formats; and guarantees the security of the extension information, that is, even if the image information in the image file is leaked, there is no need to worry about the leakage of extended information in the image file, and a user can view the content of extended information as required at any time, and meanwhile, the application fields are wide.

18 Claims, 5 Drawing Sheets

| Time (Title) | 2009-10-1 (Contents) |
|---|---|
| Location (Title) | Disneyland (Contents) |
| Character (Title) | I and my girlfriend further have a few electric bulbs (Contents) |
| Mood (Title) | Happy (Contents) |

FIG. 6

| Section length (4 bytes) | Title length (4 bytes) | Time (Title) | 2009-10-1 (Contents) |
|---|---|---|---|
| Section length (4 bytes) | Title length (4 bytes) | Location (Title) | Disneyland (Contents) |

FIG. 7

| ZteImageExTag | Number of information sections (4 bytes) | Encryption mode (1 bytes) | Length of the original contents (4 bytes) | Length of the encrypted contents (4 bytes) | Encrypted code streams |
|---|---|---|---|---|---|

FIG. 8

APPARATUS AND METHOD FOR PROCESSING EXTENSION INFORMATION IN IMAGE FILES

TECHNICAL FIELD

The present invention relates to the field of image processing technologies, and more especially, to an apparatus and a method for processing extension information in an image file.

BACKGROUND OF THE RELATED ART

The image processing generally refers to digital image processing. A digital image is a two-dimensional array obtained after sampling or digitizing via equipment such as digital cameras, scanners etc., and an element in the array is called a pixel, and a array value thereof is an integer, which is known as a gray value. The image processing technology mainly comprises three parts: image compression, image enhancement and recovery, image matching and description, and image identification.

In existing image processing technologies, the method for processing image extension information mainly adopts Exif image file specification used by JPEG files, wherein, an Exif image file header is similar to a dictionary structure, and contains an index part and a content part. In general, the relatively important index information in tag type information (defined in the Exif standard) is put together as a first level dictionary. A second level dictionary and a supplementary dictionary are added at the end of the first level dictionary, wherein, the remaining index information is put into the supplementary dictionary. Each group of Exif tags has the same structure. The index information part is composed of characters with a specified length, and generally comprises the following contents: a tag type, such as a manufacture name and so on; a tag content type, such as ASCII and so on; a tag length, which is usually an integer; and an address where the tag content is located. Except for image compression data, all other extension information, such as photographic parameters of the equipment manufacture information, lenses, and apertures and so on, can be stored in corresponding tags.

Such method in the existing technologies can store the extension information of an image file; however there are also the following disadvantages: firstly, the problem of adding extension information for all image formats cannot be solved, and other image formats, such as BMP, GIF, WBMP and so on do not support the Exif format; secondly, users can implement extension information sections only if using a specialized imaging software which supports editing Exif information when needing to edit image extension information, and can only view the content of the extension information on the terminals supporting decoding the corresponding Exif extension information sections, thus being inconvenient to use; and thirdly, the method cannot support increasing the extension information sections by the users themselves, thus limiting the flexibility for the users to edit extension information.

SUMMARY OF THE INVENTION

The technical problem to be solved by the present invention is to provide an apparatus and a method for processing extension information in an image file, to realize editing the extension information for the image files in various formats, thus achieving the flexibility of editing extension information and guaranteeing the security of the extension information.

In order to solve the aforementioned technical problem, the present invention provides an apparatus for processing extension information in an image file, which comprises: an editing module, an encrypting module, and a decrypting module; wherein, the editing module is configured to edit the extension information for the image file, and to send the edited extension information to the encrypting module;

the encrypting module is configured to encrypt the extension information edited by the editing module, and to additionally write the encrypted extension information into the image file; and the decrypting module is configured to extract the extension information encrypted by the encrypting module from the needed image file, and to decrypt the encrypted extension information.

Preferably, the apparatus for processing extension information in an image file further comprises a display module, which is configured to decode and display the extension information decrypted by the decrypting module.

Preferably, in the apparatus for processing extension information in an image file, the extension information comprises a group of extension information sections; and the extension information section comprises an extension information section title and extension information section contents.

Preferably, in the apparatus for processing extension information in an image file, the encrypting module is further configured to add section header information of the extension information section to the encrypted extension information.

Preferably, in the apparatus for processing extension information in an image file, the decrypting module is configured to extract the extension information encrypted by the encrypting module from the needed image file, to extract the encrypted extension information section from the image file according to the section header information, and to decrypt the encrypted extension information section.

Preferably, in the apparatus for processing extension information in an image file, the display module is further configured to decode and display the extension information edited by the editing module.

In order to solve the aforementioned technical problem, the present invention further provides a method for processing extension information in an image file, which comprises:

editing the extension information for the image file;

encrypting the edited extension information, and additionally writing the encrypted extension information into the image file; and extracting the encrypted extension information from the needed image file, and decrypting the encrypted extension information.

Preferably, after the step of decrypting the encrypted extension information, the method for processing extension information in an image file further comprises:

decoding and displaying the decrypted extension information.

Preferably, in the method for processing extension information in an image file, the extension information comprises a group of extension information sections; and the extension information section comprises an extension information section title and extension information section contents.

Preferably, after the step of encrypting the edited extension information and before the step of additionally writing the encrypted extension information into the image file, the method for processing extension information in an image file further comprises:

adding section header information of the extension information section to the encrypted extension information.

Preferably, in the method for processing extension information in an image file, the step of extracting the encrypted extension information from the needed image file comprises: extracting the encrypted extension information section from the needed image file according to the section header information in the encrypted extension information extracted from the needed image file; and the step of decrypting the encrypted extension information comprises: decrypting the encrypted extension information section.

Preferably, the method for processing extension information in an image file further comprises: decoding and displaying the edited extension information.

For the apparatus and the method for processing extension information in an image file in accordance with the present invention, the apparatus is configured to with anset the editing module which is used to edit the extension information for the image file, and the an encrypting module and the a decrypting module which are used to encrypt and decrypt the edited extension information, thus realizing editing the extension information for the image files in various formats, and guaranteeing the security of the extension information; and at the same time the method for processing extension information in an image file in accordance with the present invention, achieves the purpose of editing the extension information of the image in various formats, and can ensure the security of the extension information as well, by means of editing the extension information for the image file and encrypting and decrypting the edited extension information.

BRIEF DESCRIPTION OF DRAWINGS

FIG. 6 is a diagram of a format of an extension information section in an image file in accordance with the present invention;

FIG. 7 is a diagram of a format of an extension information section combination in an image file in accordance with the present invention; and FIG. 8 is a diagram of a format of an encrypted extension information section after being added with an extension information section header in an image file in accordance with the present invention.

PREFERRED EMBODIMENTS OF THE PRESENT INVENTION

The implementation of the purpose, functional characteristics and advantages of the present invention will be illustrated in further detail in combination with the embodiments and with reference to the aforementioned accompanying drawings.

In order to implement editing extension information in image files in all formats, the present invention provides an apparatus for processing the image. The apparatus is configured with an editing module which is used to edit the extension information; an encrypting module which is used to encrypt the extension information; a decrypting module which is used to decrypt the encrypted extension information; and a display module which is used to decode and display the extension information.

Figure 1:
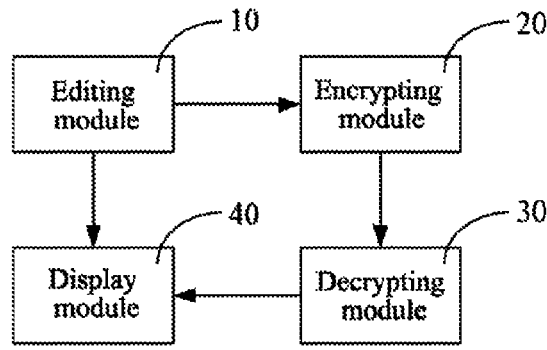
FIG. 1 is a structural diagram of an apparatus for processing extension information in an image file in accordance with the present invention.

A structural diagram of an apparatus for processing extension information in an image file of in accordance with the present invention is as shown in FIG. 1, which specifically comprises: an editing module 10, an encrypting module 20, a decrypting module 30 and a display module 40. Wherein, the editing module 10 is used to edit the extension information of the image file, comprising adding, deleting and modifying the extension information, wherein, the extension information comprises one or more extension information sections, and each extension information section further comprises an extension information section title and the extension information section contents. The encrypting module 20 is used to encrypt each extension information section, to add section header information to the encrypted extension information section, and then to additionally write the encrypted extension information section into the corresponding original image file. Wherein, the method for the encrypting module 20 to encrypt the extension information section can adopt two kinds of encryption algorithms, i.e., Data Encryption Standard (DES) and Message-Digest Algorithm 5 (MD5), but is not limited to these two kinds of encryption algorithms. The decrypting module 30 is used to extract the encrypted extension information section from the original image file, to find the section header information of the extension information, and then to read the encrypted extension information section according to the section header information, and to adopt the corresponding decryption algorithm to decrypt the extension information section so as to obtain each extension information section, and then to send each decrypted extension information section to the display module 40. The display module 40 is used to analyze, decode and display the each decrypted extension information section, and the display module 40 can directly decode and display the edited extension information as well. Wherein, the decrypting module 30 extracts the encrypted extension information section from the received original image file needed by a user.

The apparatus for processing extension information in an image file in accordance with the present invention can be widely used in a variety of terminal equipment, for example the apparatus can be applied to various types of mobile phone terminals, image browsing apparatuses and so on.

The apparatus of the present invention is set at an equipment terminal, which provides an editing interface for the extension information, and the editing interface can be a window interface. A user takes advantage of the editing module 10 in the apparatus of the present invention to edit extension information in the image file. The extension information comprises one or more groups of extension information sections. The user can use the editing module 10 to input the extension information sections of the image file on the editing interface, and each group of the extension information sections comprises an extension information section title and extension information section contents.

In the apparatus for processing extension information in an image file in accordance with the present invention, the encrypting module 20 additionally writes the encrypted extension information into the original image file, without affecting decoding the images in the original image file, and a user can browse the images, without being subject to an impact of the extension information.

In the apparatus in accordance with the present invention, under instructions of a user, the decrypting module 30 reads the encrypted extension information in the original image file, decrypts it and restores various extension information sections, which are analyzed and decoded by the display module 40 so as to be displayed in a friendly interactive way. Each group of the extension information sections comprises an extension information title and the extension information section contents.

Figure 2:
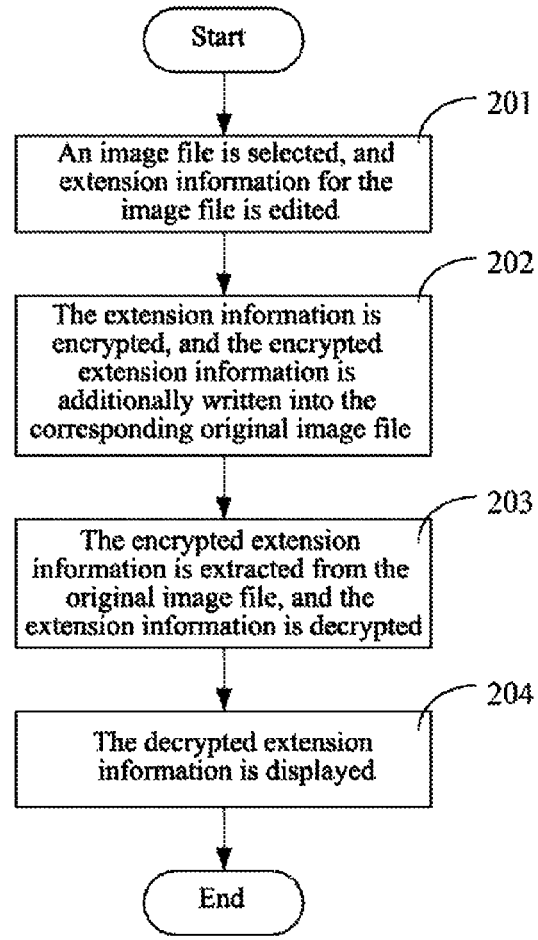
FIG. 2 is a flow chart of a first embodiment of a method for processing extension information in an image file in accordance with the present invention.

A flow chart of a first embodiment of a method for processing extension information in an image file in accordance with the present invention is shown in FIG. 2, which comprises processes of editing encrypting/decrypting, and displaying the extension information, and specifically comprises the following steps.

In step 201, an image file of which extension information is needed to be edited is selected, and the extension information of the image file is edited.

Wherein, editing the extension information comprises: adding the extension information of the image file, deleting the extension information in the image file, and modifying the extension information in the image file.

In step 202, each edited extension information section is encrypted, and section header information of the extension information section is added to the encrypted extension information, and then the encrypted extension information section is additionally written into the corresponding original image file.

Encrypting the extension information in the step adopts two kinds of encryption algorithms, i.e., DES and MD5, but is not limited to these two kinds of encryption algorithms.

The section header information of the extension information section comprises information such as a tag (namely ZteImageExTag), a number of the information sections, an encryption mode indication field (DES, MD5 or other encryption algorithms), a total length of all the original extension information sections, a total length of the encrypted extension information and so on.

In step 203, the encrypted extension information is extracted from the original image file, and the section header information of the extension information is searched for, and then the encrypted extension information sections are read according to the section header information; and the extension information is decrypted to be restored as the extension information before being encrypted.

In step 204, the decrypted extension information is decoded and displayed.

Figure 3:
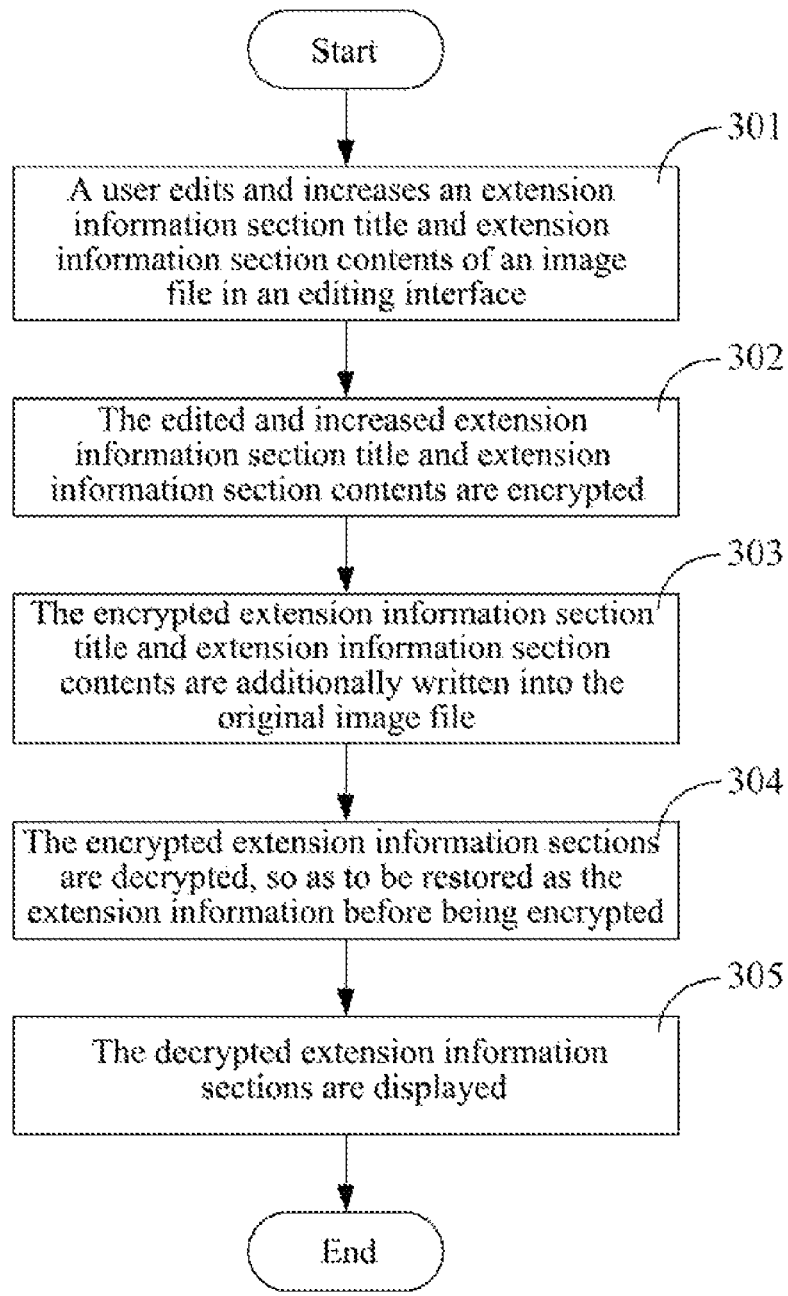
FIG. 3 is a flow chart of a second embodiment of a method for processing extension information in an image file in accordance with the present invention.

A flow chart of a second embodiment of a method for processing extension information in an image file in accordance with the present invention is shown in FIG. 3. The method for processing an image file in accordance with the present invention is illustrated by example of a process that a user edits and increases image extension information, the increased extension information is stored into the original image file, and the extension information is displayed as required. In the present embodiment, before the user edits and increases the image extension information, the user should be further provided with an editing interface for the extension information, and the embodiment specifically comprises the following steps.

In step 301, the user edits and increases an extension information section title and extension information section contents of the image file in the editing interface.

In step 302, the edited and increased extension information section title and extension information section contents are encrypted.

In step 303, the encrypted extension information section title and extension information section contents are additionally written into the original image file.

Wherein, a structure of the image information in the original image file is ensured not to be destroyed during the additionally writing.

In step 304, the encrypted extension information sections are decrypted under instructions of the user, so as to be restored as the extension information sections before being encrypted.

In step 305, the decrypted extension information sections are decoded and displayed.

Figure 4:
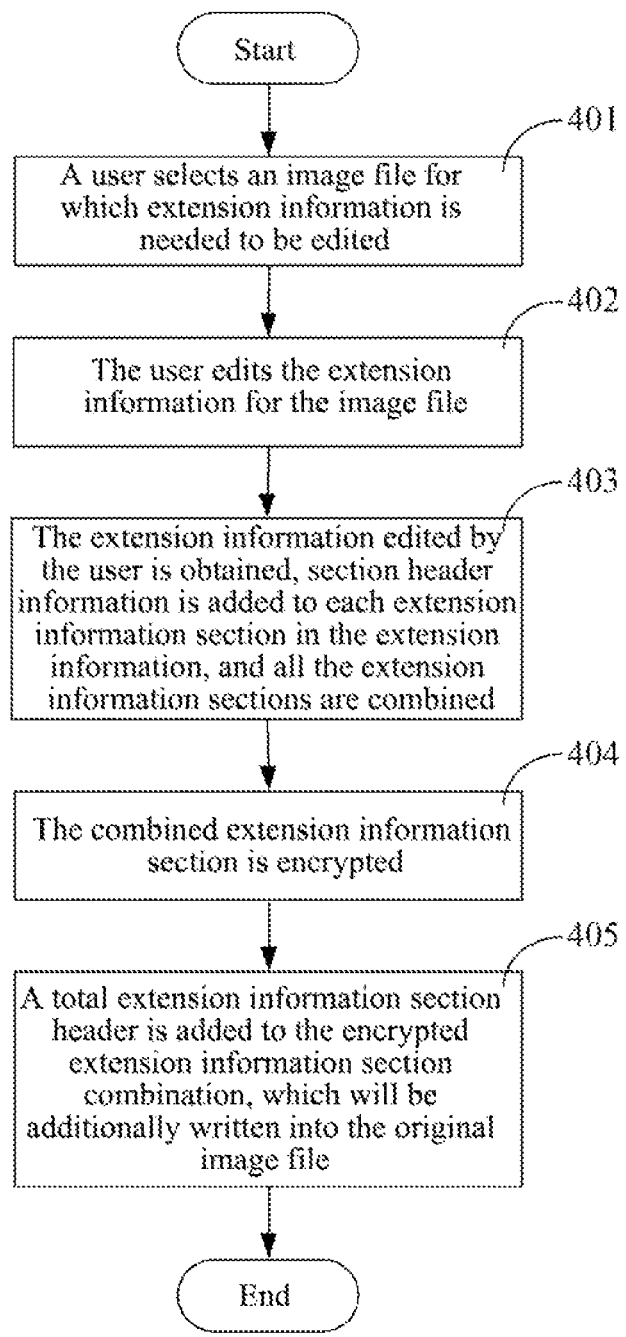
FIG. 4 is a flow chart of a third embodiment of a method for processing extension information in an image file in accordance with the present invention.

A flow chart of a third embodiment of a method for processing extension information in an image file in accordance with the present invention is shown in FIG. 4. The method of the present invention is illustrated by example of a process of decrypting and storing the extension information sections into an original image file after a user edits and increases the extension information sections, and the embodiment specifically comprises the following steps.

In step 401, the user selects an image file of which extension information is needed to be edited.

In step 402, the user edits the extension information for the image file.

The editing process comprises: adding extension information sections, inputting a corresponding extension information section title and extension information section contents in various extension information sections, and confirming an end of the editing after completing the editing, wherein, there are a plurality of extension information sections. A diagram of a format of an extension information section in an image file in accordance with the present invention is as shown in FIG. 6, and the extension information comprises: a time extension information section, a location extension information section, a character extension information section, a mood extension information section, which respectively comprise title information and content information of respective extension information section.

In step 403, the extension information edited by the user is obtained, section header information is added to each extension information section in the extension information, and all the extension information sections are combined; wherein, the extension information comprises one or more groups of extension information sections, and each extension information section comprises an extension information title and extension information section contents. The embodiment illustrates the format of the extension information section by example of two extension information sections of a time extension information section and a location extension information section. A diagram of a format of an extension information section combination in an image file in accordance with the present invention is as shown in FIG. 7, which comprises the following information: section length information, title length information, time information, and title content information.

In step 404, the extension information section combination is encrypted, wherein, the present step adopts DES, MD5 or other encryption methods to encrypt the combined extension information.

In step 405, a total extension information section header is added to the encrypted extension information section combination, and the total extension information section header comprises a tag (namely ZteImageExTag), a number of information sections, an encryption mode indication field (DES, MD5 or other encryption algorithms), a total length of all the original extension information sections, a total length of the encrypted extension information; the encrypted extension information to which the total extension information section header is added is obtained, and then the encrypted extension information is additionally written into the original image file in a binary mode. A diagram of a format of an encrypted extension information section to which an extension information section header is added in an image file in accordance with the present invention is as shown in FIG. 8, which comprises the following information: a number of information sections, an encryption mode, a length of the original contents, a length of the encrypted contents and the encrypted code streams.

Wherein, the method for encrypting the extension information in the step 405 can adopt any currently available security encryption algorithm with high security, and is not limited to the encryption algorithms of DES, MD5; and the tag is used to identify a starting point of the extended information.

Figure 5:
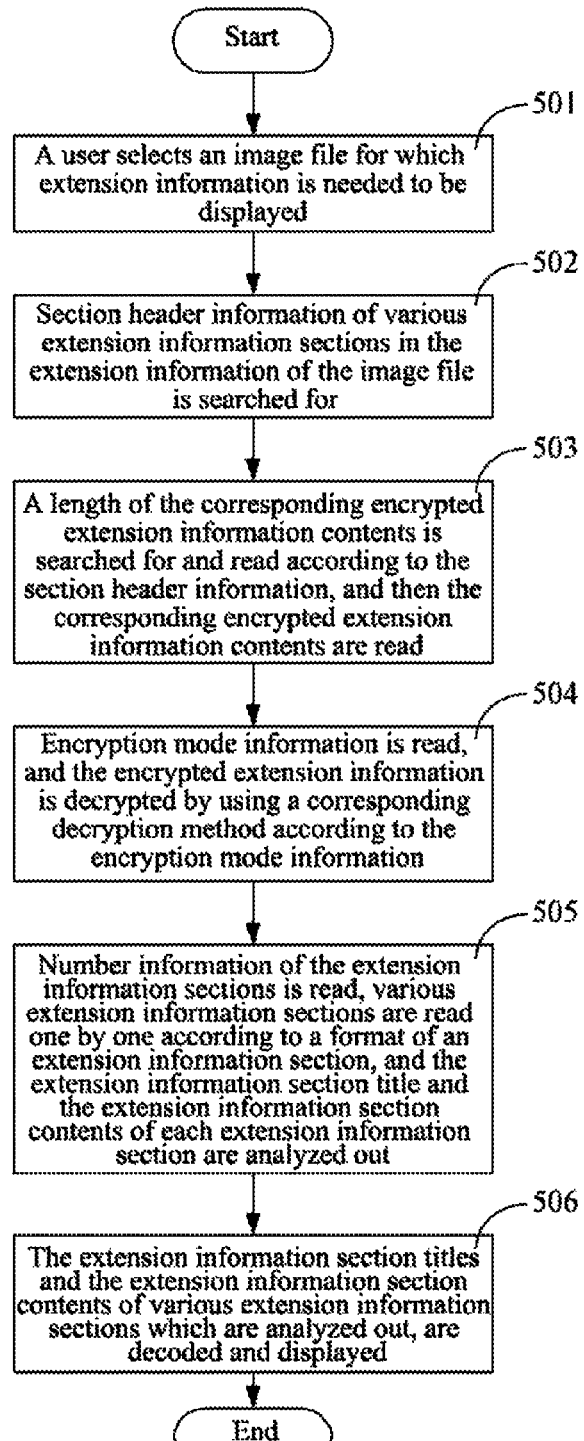
FIG. 5 is a flow chart of a fourth embodiment of a method for processing extension information in an image file in accordance with the present invention.

A flow chart of a fourth embodiment of a method for processing extension information in an image file in accordance with the present invention is shown in FIG. 5. The method in accordance with the present invention is described by example of a process that the extension information is read from the image file under instructions of a user, the extension information is encrypted, and the decrypted extension information is displayed, and the specific steps are as follows.

In step 501, a user selects an image file of which extension information is needed to be displayed.

In step 502, the content of the selected image file is searched for, and section header information of various extension information sections in the extension information of the image file is looked for in the content.

In step 503, a length of the corresponding encrypted extension information contents is searched for and read according to the section header information, and then the corresponding encrypted extension information contents are read.

In step 504, encryption mode information is read, and the encrypted extension information is decrypted using a corresponding decryption method according to the encryption mode information.

In step 505, number information of the extension information sections is read, various extension information sections are read one by one from the decrypted extension information content according to a format of an encrypted extension information section after being added with an extension information section header in an image file in accordance with the present invention, a diagram of which is shown in FIG. 8, and the extension information section title and the extension information section contents of each extension information section are analyzed out.

In step 506, the extension information section titles and the extension information section contents of various extension information sections which are analyzed out, are decoded and displayed.

Wherein, the encryption algorithm adopted in the step 504 can be any available security encryption algorithm with high security, and is not limited to the encryption algorithms of DES and MD5.

For the apparatus and the method for processing extension information in an image file in accordance with the present invention, the apparatus is configured with an editing module which is used to edit the extension information for the image file, an encrypting module and a decrypting module which are used to encrypt and decrypt the edited extension information, and a display module which is used to display the extension information; thus realizing editing the extension information for the image files in various formats, and guaranteeing the security of the extension information; even if the image information of an image file is leaked, it does not have to be worried about the leakage of the extended information in the image file, and a user can view the content of the extended information as required at any time, and meanwhile, the application fields are wide, and the apparatus and the method can be applied to a variety of terminal equipment, such as mobile phone terminals, image browser apparatuses and so on.

The above disclosure is only the specific embodiments of the present invention, and is not intended to limit the present invention. All modifications, which can be thought of by the skilled in the art, should belong to the protection scope of the present invention.

INDUSTRIAL APPLICABILITY

For the apparatus and the method for processing extension information in an image file in accordance with the present invention, the apparatus is configured with an editing module which is used to edit the extension information for the image file, an encrypting module and a decrypting module which are used to encrypt and decrypt the edited extension information, and a display module which is used to display the extension information; thus realizing editing the extension information for the image files in various formats, and guaranteeing the security of the extension information; and even if the image information of an image file is leaked, there is no need to worry about the leakage of the extended information in the image file, and a user can view the content of the extended information as required at any time, and meanwhile, the application fields are wide.

What is claimed is:

1. An apparatus for processing extension information in an image file, comprising a processor and a storage device, wherein the storage device stores processor-executable programs and the programs comprise: an editing module, an encrypting module, and a decrypting module, wherein,
the editing module is configured to edit the extension information for the image file, and to send the edited extension information to the encrypting module;
the encrypting module is configured to encrypt the extension information edited by the editing module, and to additionally write the encrypted extension information into the image file; and
the decrypting module is configured to extract the extension information encrypted by the encrypting module from the image file, and to decrypt the encrypted extension information;
wherein the editing module allows a user to edit the extension information in the image file by adding the extension information of the image file, deleting the extension information in the image file, or modifying the extension information in the image file; and
additionally writing the encrypted extension information into the image file by the encrypting module does not affect decoding an image in the image file, and a user can browse the image without being impacted by the encrypted extension information.

2. The apparatus for processing extension information in an image file of claim 1, further comprising a display module, which is configured to decode and display the extension information decrypted by the decrypting module.

3. The apparatus for processing extension information in an image file of claim 2, wherein, the display module is further configured to decode and display the extension information edited by the editing module.

4. The apparatus for processing extension information in an image file of claim 2, wherein, the extension information comprises a group of extension information sections; and each of the extension information sections comprises an extension information section title and extension information section contents.

5. The apparatus for processing extension information in an image file of claim 4, wherein, the encrypting module is further configured to add section header information of the extension information sections to the encrypted extension information.

6. The apparatus for processing extension information in an image file of claim 5, wherein, the decrypting module is configured to extract the extension information encrypted by the encrypting module from the image file, to extract the encrypted extension information sections from the image file according to the section header information, and to decrypt the encrypted extension information sections.

7. The apparatus for processing extension information in an image file of claim 1, wherein, the extension information comprises a group of extension information sections; and each of the extension information sections comprises an extension information section title and extension information section contents.

8. The apparatus for processing extension information in an image file of claim 7, wherein, the encrypting module is further configured to add section header information of the extension information sections to the encrypted extension information.

9. The apparatus for processing extension information in an image file of claim 8, wherein, the decrypting module is configured to extract the extension information encrypted by the encrypting module from the image file, to extract the encrypted extension information sections from the image file according to the section header information, and to decrypt the encrypted extension information sections.

10. A method for processing extension information in an image file, the method being applied in a terminal device and comprising the following steps performed by a processor in the terminal device:
    editing the extension information for the image file;
    encrypting the edited extension information, and additionally writing the encrypted extension information into the image file; and
    extracting the encrypted extension information from the image file, and decrypting the encrypted extension information;
    wherein a user is allowed to edit the extension information in the image file by adding the extension information of the image file, deleting the extension information in the image file, or modifying the extension information in the image file; and
    additionally writing the encrypted extension information into the image file does not affect decoding an image in the image file, and a user can browse the image without being impacted by the encrypted extension information.

11. The method for processing extension information in an image file of claim 10, wherein, after the step of decrypting the encrypted extension information, the method further comprises:
    decoding and displaying the decrypted extension information.

12. The method for processing extension information in an image file of claim 11, wherein, the extension information comprises a group of extension information sections; and each of the extension information sections comprises an extension information section title and extension information section contents.

13. The method for processing extension information in an image file of claim 12, wherein, after the step of encrypting the edited extension information and before the step of additionally writing the encrypted extension information into the image file, the method further comprises:
    adding section header information of the extension information sections to the encrypted extension information.

14. The method for processing extension information in an image file of claim 13, wherein,
    the step of extracting the encrypted extension information from the image file comprises: extracting the encrypted extension information sections from the image file according to the section header information in the encrypted extension information extracted from the image file; and
    the step of decrypting the encrypted extension information comprises: decrypting the encrypted extension information sections.

15. The method for processing extension information in an image file of claim 10, wherein, the extension information comprises a group of extension information sections; and each of the extension information sections comprises an extension information section title and extension information section contents.

16. The method for processing extension information in an image file of claim 15, wherein, after the step of encrypting the edited extension information and before the step of additionally writing the encrypted extension information into the image file, the method further comprises:
    adding section header information of the extension information sections to the encrypted extension information.

17. The method for processing extension information in an image file of claim 16, wherein,
    the step of extracting the encrypted extension information from the image file comprises: extracting the encrypted extension information sections from the image file according to the section header information in the encrypted extension information extracted from the image file; and
    the step of decrypting the encrypted extension information comprises: decrypting the encrypted extension information sections.

18. The method for processing extension information in an image file of claim 10, further comprising:
    decoding and displaying the edited extension information.

* * * * *